United States Patent

Kawan et al.

[11] Patent Number: 5,844,218
[45] Date of Patent: Dec. 1, 1998

[54] METHOD AND SYSTEM FOR USING AN APPLICATION PROGRAMMABLE SMART CARD FOR FINANCIAL TRANSACTIONS IN MULTIPLE COUNTRIES

[75] Inventors: Joseph C. Kawan, Hollywood; Warren Yung-Hang Tan, Thousand Oaks, both of Calif.

[73] Assignee: Transaction Technology, Inc., Santa Monica, Calif.

[21] Appl. No.: 683,781

[22] Filed: Jul. 16, 1996

[51] Int. Cl.⁶ .......................... G06K 05/00; G06F 17/60
[52] U.S. Cl. .......................... 235/380; 235/379; 902/8; 902/25; 902/26
[58] Field of Search .................... 235/379, 492, 235/380; 902/8, 21, 25, 26

[56] References Cited

U.S. PATENT DOCUMENTS

| | | | |
|---|---|---|---|
| 4,001,550 | 1/1977 | Schatz | 902/26 |
| 4,605,844 | 8/1986 | Haggan | 902/26 |
| 4,709,137 | 11/1987 | Yoshiba | 902/26 |
| 4,727,244 | 2/1988 | Nakano et al. | 902/26 |
| 4,736,094 | 4/1988 | Yoshida | 902/26 |
| 4,766,293 | 8/1988 | Boston | 235/379 |
| 4,868,376 | 9/1989 | Lessin et al. | 235/492 |
| 4,874,935 | 10/1989 | Younger | 235/492 |
| 4,961,142 | 10/1990 | Elliott et al. | 364/408 |
| 5,036,461 | 7/1991 | Elliott et al. | 364/408 |
| 5,049,728 | 9/1991 | Rovin | 235/492 |
| 5,265,033 | 11/1993 | Vajk et al. | 364/514 |
| 5,367,561 | 11/1994 | Adler et al. | 379/93 |
| 5,420,412 | 5/1995 | Kowalski | 235/492 |
| 5,577,121 | 11/1996 | Davis et al. | 380/24 |

*Primary Examiner*—Donald T. Hajec
*Assistant Examiner*—Douglas X. Rodriguez
*Attorney, Agent, or Firm*—Kilpatrick Stockton LLP; George T. Marcou

[57] ABSTRACT

A smart card for financial transactions that can be programmed to operate using a variety of applications is disclosed. The card includes an interpreter that interfaces the smart card and an automatic teller machine or merchant terminal. The card includes a plurality of application modules each of which contain application programming that can be used by the interpreter to manage the card-to-system interface. At least one of the application modules can be reprogrammed to provide application programming for the interpreter that is compatible with the locally prevalent application program used by automatic teller machines and card terminals in the area where the cardholder is traveling.

4 Claims, 4 Drawing Sheets

METHOD AND SYSTEM FOR USING AN APPLICATION PROGRAMMABLE SMART CARD FOR FINANCIAL TRANSACTIONS IN MULTIPLE COUNTRIES

FIELD OF THE INVENTION

The present invention relates to the field of smart cards for conducting financial transactions. More particularly, the present invention relates to a smart card that can be programmed with the proper application to transact with automatic teller machines and merchant terminals in any area to which the cardholder is traveling.

BACKGROUND OF THE INVENTION

Credit cards, debit cards, and automatic teller machine cards are widely used by consumers around the world to access, transfer and spend money. These cards make use of a magnetic strip disposed on the back of the card which is encoded with information about the cardholder and the account or accounts accessed by the card. Terminals, which may be automatic teller machines (ATMs) or merchant terminals at a place of business or point of sale, are used to read the coded information on the card and access the cardholder's account to complete a financial transaction.

Besides the well-known credit and debit cards, stored value cards are becoming increasingly popular. A stored value card is a card that is purchased or established for a specific monetary amount. That monetary amount is stored as the value of the card. When the cardholder desires to use the stored value card to purchase goods or services, the card is presented at the point of sale and the cost of the goods or services purchased is deducted from the value of the card.

The cardholder may continue to use the stored value card in this manner until all the value has been removed from the card. The card may then be discarded user of the care may provide a method for replenishing the value of the card. Such cards are commonly used today as a means for paying subway fare and making phone calls.

The development of such convenient financial instruments has also produced "smart cards" which are especially popular in Europe. Rather than employing information encoded on a magnetic strip, smart cards incorporate a microprocessor which is embedded in the card and can interact with the ATM or merchant terminal to provide information about the cardholder or the cardholder's account, transaction authorization, or other information. Various smart card designs and applications are described in the following U.S. patents which are incorporated herein by reference: U.S. Pat. Nos. 4,766,293 (Boston); U.S. Pat. No. 4,868,376 (Lessin et al.); and U.S. Pat. No. 4,874,935 (Younger)

Advanced smart cards, called very smart cards, may even include a battery, a keypad and an LCD display on the face of the card. However, due to the expense of such advanced cards, typical smart cards have no keypad or display and look like other plastic credit cards.

Because the microcomputer is embedded in the smart card body, the card surface must include electrical contacts which function as a communications port to interface the microcomputer in the card with a processor in an ATM or a merchant terminal. The power, input, and display for a smart card microcomputer is thus provided by interfacing the card with an ATM or merchant terminal.

A smart card terminal must be provided with a detection mechanism to determine when a smart card has been inserted and that the card is properly positioned. To be properly positioned, the communications contacts on the card must be in contact with electrical contacts that communicate with the terminal processor.

Once the smart card is properly positioned, the terminal will provide power to the microcomputer on the card and send a reset (RST) signal to the card. The card uses the RST signal to reset itself or to initiate an internal reset function. When the card is reset, it sends the terminal an answer-to-reset (ATR) signal. The ATR signal informs the card terminal of basic information about the card so that communications between the card and the terminal can be established accordingly.

Smart cards can be designed to operate as stored value cards, credit cards, debit cards, ATM cards, calling cards, etc. A smart card may also be designed to perform any combination of these various functions. However, the ability to readily program a smart card and the broad range of possibilities for doing so allows compatibility problems to arise between different smart cards and supporting systems.

In order for travelers to be able to use smart cards throughout the world for financial transactions, cards and card terminals in one country or region must be compatible with cards and card terminals in other countries or regions. To make smart cards compatible with systems around the world, there must be physical standards for the actual construction of the cards, standards for the functioning of the cards, and standard applications (i.e., software) being executed by and with the cards.

The usefulness of a credit or debit card, whether a smart card or a magnetic strip card, is largely determined by how widely the card is accepted. In the case of a smart card, a bank will attract more customer if the smart cards it issues can be used to access money at many ATMs and to make purchases at many places of business. A merchant will attract more customers if he or she provides a merchant terminal that can interact with the smart cards that customers carry. Thus, both banks and merchants will have an incentive to create a system of compatible smart cards and terminals in their country or region. This may lead to a de facto compatibility standard or the government or a business association authority may actively establish compatibility standards in a particular country or region.

However, smart card and system compatibility will not necessarily or even likely extend beyond the country or region where compatibility has been established unless there are strong retail ties at the consumer level that cross the national or regional border. Thus, if smart cards and terminals in each country or region are constructed differently, function differently or use different application programs, a smart card cannot be used outside the area where it was issued. Accordingly, there is a need for a smart card and a supporting system that can allow a smart card to operate with a variety of incompatible systems.

Global standards for the physical construction of smart cards have been established and widely accepted. The International Standards Organization (ISO) standard 7816-1 to -6 specifies the physical characteristics of smart cards such as the size, composition, placement of electrical contacts, the electrical interface, the method of data transmission for smart cards i.e. T=0, T=1 etc., the interface message format and identification of applications stored in the card.

While ISO standard 7816 has largely led to uniformity in the physical construction and communication protocol of smart cards, the standard does not specify the operating system or the application programming to be used. The operating system a smart card uses is the software that tells the microcomputer on the smart card how to execute application programs. For example, the Disk Operating System (DOS) used by IBM-compatible desktop computers or System 7s used by Apples Machintoshe computers are operating systems.

A smart card operating system (SCOS) is established by the manufacturer of the microcomputer embedded in the smart card. To protect it from being erased or modified, the SCOS will likely be hard-wired or masked onto the semiconductor chip of the card's microcomputer and/or partially stored in EEPROM. Because there are relatively few manufacturers of smart cards in the world and because smart cards are now produced that can function using more than one operating system, lack of a standard operating system is not seen as a significant obstacle to making smart cards compatible in a variety of countries or regions.

Similarly, the protocol used by smart cards is not a barrier to compatibility across national and regional borders. The International Standard Organization has defined two standard methods for structuring information for transmission between a smart card and an ATM or merchant terminal. They are: the character mode protocol (T=0), and a block mode protocol (T=1). As part of the power up sequence, an Automatic Termination Response (ATR) message is returned from the smart card to identify the transmission protocol it supports. Both transmission protocols are widely accepted by either ATM's or merchant terminals, and some smart cards can function using either the T=0 or T=1 protocols. Based on the ATR message, the terminal and smart card can then agree on a protocol and transact. Thus, smart card protocol is not an obstacle to global compatibility.

The principal difference that prevents smart cards of one country or region from being compatible with terminals in another country or region is the application program used. In this context, an application program is a piece of software for managing financial transactions. The computer in an ATM or merchant terminal executes an application program in conjunction with application programming in the microcomputer on the smart card.

Even if a smart card and an ATM are physically compatible and use the same SCOS and protocol, transactions cannot be conducted if the program being run by the ATM and the programming on the smart card are not compatible. Further complicating the problem is the fact that smart cards and terminals may likely use different application programs depending on the how the card is being used. For example, if the card is being used as a stored value card the card terminal will likely be running a different program than if the same card is being used as a credit card.

In general, the program being run by an ATM or other card terminal and the programming on a smart card may be incompatible in three principal areas: 1) security algorithms, 2) access conditions, and 3) data structure. Because smart cards are as easily programmed as any computer, a variety of application programs have been developed by different authorities, in different countries and regions which are incompatible with each other.

In Europe for example, the ATMs in each country generally have a standardized national application program for stored value cards that is different from the application program used in other countries. Thus, for example, a German smart card functioning as a stored value card cannot be used in Belgium where Belgian stored value cards are accepted.

One solution to the problem of diverse application programs would be to establish a single standard application program that is used world-wide, or at least internationally for the particular functions a smart card may perform. Several such potential standards for stored value cards, such as: VISA Cash, MasterCard Cash, Mondex are emerging. However, these applications are not interoperable and a terminal requires tremendous investment to support all these applications. Besides, many countries and regions have already established various local applications for smart cards. Though advantageous, switching to a standard application program will require modifying or replacing all the smart cards, ATMs and merchant terminals that use existing localized application programs.

There will clearly be resistance to such an expensive project and the adoption of a universal application program for smart cards may be some distance in the future. Accordingly, there is a need for a method of using smart cards with different systems and a variety of applications that can be implemented quickly and at reasonable cost.

A first principal characteristic of smart card programming is its security system. In financial applications, security is a key concern in the use of smart cards. To inspire bank, merchant and cardholder confidence in smart card technology, smart cards must be provided with security features to prevent unauthorized use of a lost or stolen card. Smart card security features must also prevent someone from fraudulently adding value to a card and from counterfeiting a card that can access a cardholder's account.

The integrated circuits (IC's) used in smart cards are physically designed for security. For example, the key electrical signal leads are placed below the top layer of the IC construction. This helps prevent a counterfeiter from probing the leads to determine the electronic addresses at which particular data is stored. Without this information, a counterfeiter cannot successfully counterfeit or compromise a smart card.

Another example of a security feature is particularly applicable to stored value cards. When functioning as stored value cards, smart cards can be programmed and re-programmed to contain a particular value as desired by the cardholder. This value is gradually depleted as purchases are made. A merchant terminal at a point of sale may be able to simply deduct value from the smart card, or the card can be designed to require the cardholder to input a personal identification number (PIN) before value may be deducted from the card.

This security feature protects the value of the card from unauthorized use if the card is lost or stolen. A smart card may have both freely-accessible value and PIN-protected value stored on it. An ATM can be provided with options that allow the cardholder to set the value of the smart card as desired.

A smart card can have the option of allowing the user to lock and unlock the electronic purse using a personal reader device equivalent in size to a small hand held calculator.

To provide a higher level of security, a smart card system can make use of security algorithms. A security algorithm is a series of mathematical functions that can be performed on a number or alphanumeric string. With a security algorithm, an ATM or a merchant terminal will perform the steps of the algorithm on a randomly generated string. This is called encryption.

The result is communicated by the ATM or merchant terminal to the smart card. The smart card then performs the steps of the algorithm in reverse order on the encrypted string provided by the ATM or merchant terminal. This is called decryption. An encryption key is a specific number or string that is used to govern the behavior of the encryption/decryption process. If the smart card has the correct algorithm and encryption key, it will generate the same string with which the ATM or merchant terminal started.

Encryption and decryption, also called ciphering and deciphering, prevent someone from counterfeiting a smart card as long as the encryption keys are known only to the issuer of the smart card and the entity supporting the ATM and merchant terminal system. If the smart card's result is the same string with which the ATM or merchant terminal started, the smart card is authenticated and the desired transaction may proceed.

Two types of encryption schemes now in use are an asymmetric encoding system and a symmetrical encoding system In a symmetrical encoding system, both encipher and decipher use an identical key. In order to maintain the security for the whole system, this key must be kept secret. Several symmetrical encoding system which have been adopted by the industry are entitled the Data Encryption Standard (DES) and the RC4/RC5 algorithm proposed by RSA. The DES algorithm has been used longer than any other algorithm and has been more widely accepted by the world-wide financial industry. Every card and each terminal used in the system must have the correct key established to reach the correct result and be authenticated when challenged. To be successful, a counterfeiter must determine the correct key. Aided with a limited number or retrials, the level of security is raised.

An asymmetrical encoding system uses a pair of keys to cipher/decipher respectively. Knowledge of one key does not aid in the derivation of the other key. This encoding algorithm allows the sender to publish one key (public key) and keep the other key (private) secret without compromising the system's security. Therefore, the asymmetrical encoding system is also called the public key cryptography (PKC) system.

In an asymmetrical encoding system, both a public and private key are used with the security algorithm. The private key is specific to each cardholder's account and will be known only by the ATM or merchant terminal and the cardholder's smart card. By keeping this key secret, the counterfeiter will have problems penetrating the system.

In addition, different public and private keys can be established for when the smart card is being used as a credit card, a stored value card, a debit card, etc. Though effective, such security measures increase the cost of the smart card in proportion to the level of security provided.

Additionally, messages transmitting information or instructions between a smart card and a terminal may be encrypted by the sender and decrypted by the receiver to prevent a counterfeiter from tapping into the communication between an authentic card and an authorized terminal to make illicit use of the interaction.

While indispensable, such security features contribute to the compatibility problems smart cards may experience. For example, if the application programming on the smart card has different security algorithms or uses its algorithms differently than the application program being run by the terminal, transaction between card and terminal will be impossible. Likewise, if the security programming on the smart card uses public keying only or public and private keying, it cannot transact with any terminal unless the application program run by the terminal uses the same keying scheme.

The second principal characteristic of a smart card application program is the set of access conditions. A computerized system, such as smart cards and card terminals, must have a system which allows the card or the card terminal to read and write data in memory when doing so is appropriate. The application programming on the smart card or the application program being run by the terminal tells the components of the system when to read and write data and allows reading/writing under the established access conditions. If the access conditions specified by the programming on the smart card and the access condition used by the application program being executed by the terminal are different, the card and terminal cannot complete a transaction.

The third principal characteristic of a smart card application program is its data structure. The data structure is the set of rules an application program uses to determine where in the memory of the smart card particular data or types of data will be stored. If an application program running on the ATM or merchant terminal expects to find a particular data structure on the smart card, and the programming on the smart card has configured the data on the card differently, the ATM or merchant terminal will be unable to locate the required data on the smart card and will be unable to transact with the card.

Thus, there is a need for a smart card that can be programmed to operate compatibly with a variety of application programs depending on where the cardholder will smart card. There is also a need for an ATM system which can recognize and appropriately program such smart cards as needed by the cardholder.

SUMMARY OF THE INVENTION

Accordingly, it is an object of the present invention to meet the above-stated needs and others. It is an object of the present invention to provide a smart card which can be programmed with a variety of application programs depending on the application program that is most widely used where the cardholder will need the smart card, and an ATM system which can recognize and appropriately program such smart cards as needed by the cardholder.

Additional objects, advantages and novel features of the invention will be set forth in the description which follows or may be learned by those skilled in the art through reading these materials or practicing the invention. The objects and advantages of the invention may be achieved through the means recited in the attached claims.

The present invention is a smart card (e.g., a plastic credit or debit card with a microcomputer embedded in the card) which stores financial and account identification information in memory. In order to use such a card, the computer in an automatic teller machine (ATM) or in a merchant terminal at a point of sale must interface with the microcomputer in the smart card.

To be interfaced, the terminal computer and the computer in the smart card must have compatible application software. However, ATMs in different countries or regions may use different application programs. According to the present invention, a smart card is provided that can be programmed to operate using any local application program.

The smart card of the present invention has at least two allocated areas of memory or modules. The first memory module is programmed with the application program that is prevalent in the cardholder's home country or region. The second memory module is available for programming to enable the smart card to function using a different application program, one that where the cardholder is traveling.

According to the principles of the present invention, a smart card signals which application programs it can function with compatibly. The card also indicated to the ATM that it is programmable. The ATM is designed to recognize such a message from the smart card and signal the card whether or not the card is programmed with application programming supply the ATM.

If no such compatibility exists, the ATM is designed to offer the cardholder an option to add programming to the smart card that will then allow it to transact with the ATM. If the cardholder accepts, the ATM will add the programming to the smart card so that the smart card can be used with that ATM and all other card terminals in the area that rely on the same application program.

In this invention, it is assumed that:

The financial institution has been authorized to create application structure in a smart card to support a local SVC application, and The smart card's file structure is capable of being altered under a secure, special access control after the structure has been created.

To achieve the stated and other objects of the present invention, as embodied and described below, the invention may comprise:

an automatic teller machine; and a smart card with at least one programmable application module and an interpreter module where the interpreter module manages the interface between the smart card and the automatic teller machine;

the interpreter module uses application information from the application module to manage the interface between the smart card and the system;

the automatic teller machine recognizes the smart card as a programmable smart card regardless of application programming in the application module; and the automatic teller machine programs the application module.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Using the drawings, the preferred embodiment of the present invention will now be explained. All examples are merely illustrative. As will be recognized by those of ordinary skill in the art, the principles of the invention are applicable whenever a smart card performing any function is to be used with two systems which run incompatible application programs.

Figure 1:
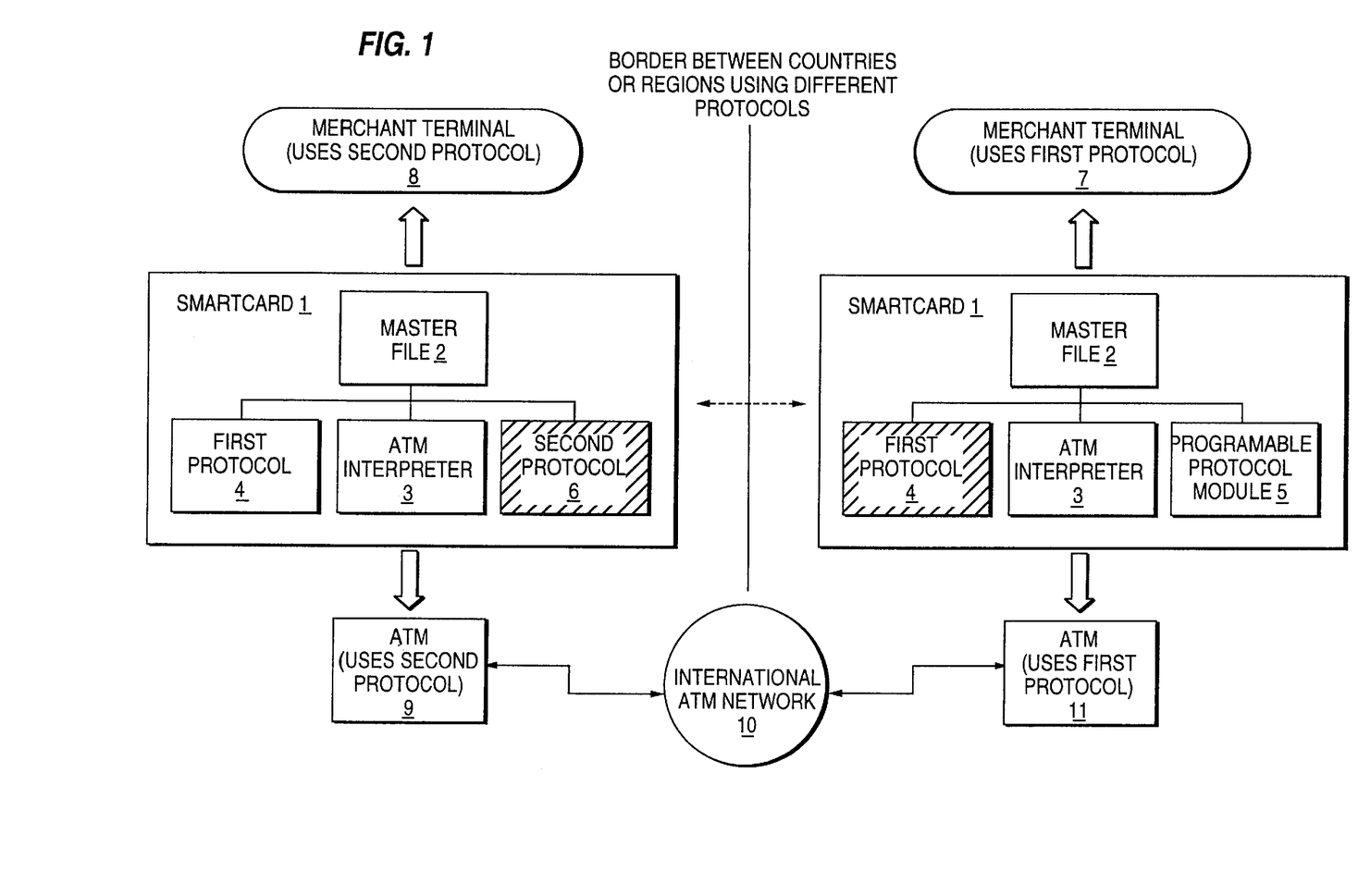
FIG. 1 is a block diagram of the smart card and supporting system of the present invention in a generic example.

In the example of FIG. 1, a smart card (1) is issued to a cardholder. Financial information, which depends on the function of the smart card, is stored in the master file (2). In the country or region where the cardholder lives, the ATM (11) and merchant terminal (7) systems for smart cards use a standard first application program for a particular financial function i.e., crediting, debiting, storing value, etc.

Smart card (1) has a first application module (4) and an ATM interpreter (3). The ATM interpreter (3) is a generalized application program that performs the basic function of smart card application programs, but does not have the specific perimeters, security features, access conditions, and data structure rules that distinguish one smart card application program from another.

The first application module (4) contains additional programming which can fill in the gaps for the ATM interpreter (3) to allow the ATM interpreter (3) to interface the smart card (1) with either an ATM (11) or a merchant terminal (7) that is using the first application program. The ATM interpreter (3) dynamically loads parameters from the first application module (4) characteristic of the first application program being used by the ATM (11) or merchant terminal (7). In this way, the ATM interpreter (3) can mimic the functionality of a smart card programmed specifically for use with the first application program which is being used by the ATM (11) or merchant terminal (7).

More specifically, the first application module (4) provides the ATM interpreter (3) with the proper security algorithms and with the appropriate keying scheme for use with terminals using the first application. When an ATM (11) or merchant terminal (7) using the first application seeks to authenticate the smart card (1), the appropriate response will be provided by the ATM interpreter (3) using parameters loaded from the first application module (4). Transactions between card and terminal can then proceed.

The first application module (4) also provides the ATM interpreter (3) with the access condition parameters as they are defined by the first application program. The ATM interpreter (3) then allows access to the master file (2) based on the access conditions of the first application used by the ATM (11) or merchant terminal (7).

To present the proper data structure to the ATM, the first application module (4) provides a map that maps the data location of the data in the master file (2) with the data structure specified by the first application program. Thus, when an ATM (11) or merchant terminal (7) using the first application attempts to access data from the smart card (1) according to the data structure used by the first application program, the ATM interpreter (3), using the data map provided by the first application module (4), will interpret the request and access the correct data in the master file (2) even if it is located differently (i.e. is organized in a different data structure with a different electronic address) than the first application specifies.

The smart card (1) also comprises a programmable application module (5). In the present example, the cardholder desires to use the smart card (1) during a trip to another country or region. In the second country or region, ATMs (9) and merchant terminals (8) use a second application program which is different from and incompatible with the first application program used in the cardholder's home country or region. Thus, before the cardholder's smart card (1) can be used in the second country or region, the programmable application module (5) must be programmed to function as a second application module (6). Once programmed, the second application module (6) enables the smart card (1) to interact with ATMs (9) and merchant terminals (8) that use the second application program in exactly the same manner as described above.

According to the principles of the present invention, the programming of the programmable application module (5) to a second application module (6) can be performed at the ATM (11) in the cardholders home region or the ATM (9) after the card holder has begun traveling. Having the card programmed with a new application after it is brought into a new country where that new application is used may be necessary if the country involved has strict controls on the export of security algorithms or other application components that are used in that country.

If the smart card is not programmed with a second application module (6) until it arrives in the second country or region, the ATM (9) using the second application program must be able to recognize the smart card (1) as a card that can be programmed with the local application program. This is accomplished by designing the ATM interpreter (3) to send a message to the ATM (9) indicating what application programs the smart card has been programmed for and that the card is programmable. This message may be a part of the ATR or may be a message sent soon after the ATR.

Accordingly, the ATMs in each country and region must be designed to recognize this message from the ATM interpreter (3) and to respond to the card by designating which, if any, of the application programs available on the card is used by the ATM (9).

If the ATM (9) does not use or support an application program compatible with any programmed on the smart card, the ATM may give the cardholder the option to program the smart card (1) with the local application program which the ATM (9) does use. If the cardholder assents, the ATM (9) may then program the second application module (6) with programming compatible with the second application program and the transaction may then proceed.

This is best accomplished if the same financial institution owns and operates the ATMs used by the cardholder in both countries and both ATMs are connected to the same international ATM network (10). Thus, when the cardholder arrives in the second region or country, if the smart card (1) has not already been programmed with the second application program, the cardholder's smart card (1) will still be recognized as an application programmable smart card because of the message sent by the ATM interpreter (3).

Alternatively, this entire process of programming could be performed at the ATM (11) using the first application program, if the cardholder anticipates a trip to the country or region where the second application program is prevalent. The ATM (11) would be designed to provide an option allowing the cardholder to request programming for a second application program. The ATM (11) would then provide a menu of various application programs available that can be added to the cardholder's card as a second application program in the application programmable module (5). In this example, the first application module (4) remains unchanged.

The smart card (1) depicted on the right of FIG. 1 indicates the smart card is in the country or region where the ATMs and merchant terminals use the first application program. Accordingly, the first application module (4) is highlighted to indicate that the first application programming is being used by the ATM interpreter (3) to govern the interface between the card (1) and the ATM (11) or merchant terminal (7).

The smart card (1) depicted on the left of FIG. 1 indicates the smart card is in the second country or region where the second application program is used by the ATMs (9) and merchant terminals (8). When the smart card (1) is interfaced with the ATM (9) or merchant terminal (8), the ATM interpreter (3) will be informed that the second application program is recognized by the system and will accordingly use the programming in the second application module (6) to govern the interface.

If the smart card is then returned to the first area where the first application program is used, no reprogramming is necessary. The ATM interpreter module will be informed that the ATM (11) or the merchant terminal (7) use the first application program and will accordingly use the information still stored in the first application module 4 to govern the interface between the card (1) and the ATM (11) or terminal (7).

The ATM interpreter (3) thus acts as a switch that makes use of the appropriate application module depending on the application used by the ATM or merchant terminal. This is accomplished by designing the ATM interpreter to address the memory locations of either of the two application modules depending on which module contains the programming needed. While the first application module (4) remains programmed with the first application programming, the second application module 6 may be reprogrammed with a third application for another country or region if the cardholder anticipates or experiences the need for doing so.

Figure 2:
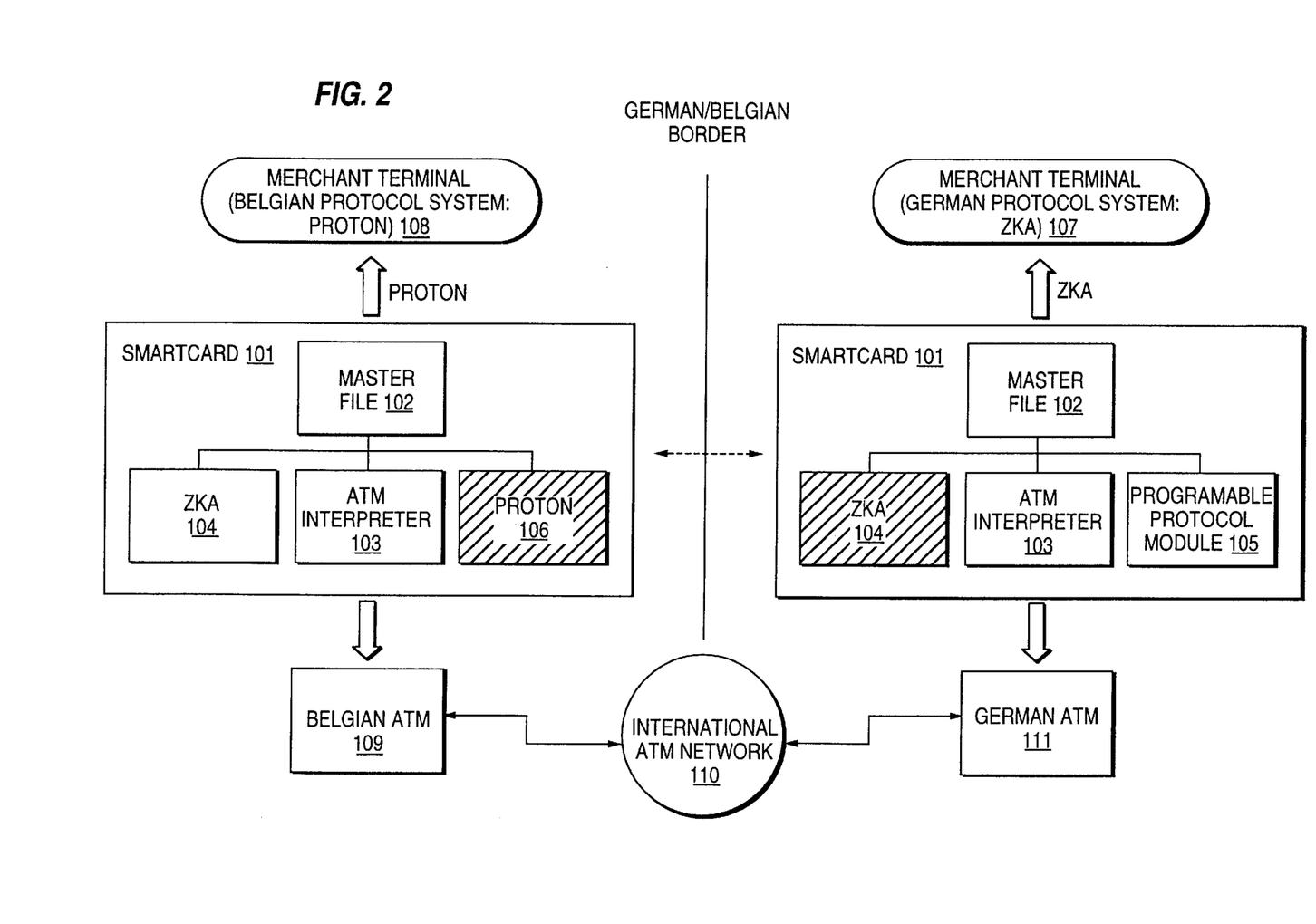
FIG. 2 is a block diagram of the smart card and supporting system of the present invention in a specific example.

FIG. 2 illustrates a specific example of a stored value smart card that is used in Germany and Belgium. In the example of FIG. 2, a smart card (101) is issued to a cardholder who lives in Germany. The stored value information, the account identification and the monetary amount stored are recorded in the master file (102). In Germany, the ATM 111 and merchant terminal (107) systems for stored value cards use an application program standardized by the national banking authority, ZKA. Thus, smart card (101) has a ZKA application module 104 that is programmed with the information needed to allow the ATM interpreter (103) to interact with either a German ATM 111 or a German merchant terminal (107) that is running the ZKA application program for stored value cards.

The ZKA module (104) provides the ATM interpreter (103) with the security algorithms and keying scheme used with the ZKA application program. Accordingly, when a German ATM (111) or merchant terminal (107) which is executing the ZXA application program seeks to authenticate the smart card (101), the appropriate response can be provided by the ATM interpreter (103).

The ZKA module (104) also provides the access conditions used by the ZKA application program to the ATM interpreter (103). The ATM interpreter (103) then allows access to the master file (102) based on the ZKA access conditions that the ZKA-based ATM (111) or merchant terminal (107) expect.

To present the proper data structure, the ZKA module (104) provides a map that maps the data structure of the data in the master file (102) to the standard ZKA data structure. Thus, when a ZKA-based ATM (111) or merchant terminal (107) attempts to access data from the smart card (101) according to the ZKA data structure, the ATM interpreter (103), using the data map provided by the ZKA module (104), will interpret the request and access the correct data in the master file (102) even if it is located differently (i.e. is organized in a different data structure) than the standard ZKA data structure.

The smart card (101) also comprises a programmable application module (105). In the present example, the cardholder desires to use the smart card (101) during a trip to Belgium. In Belgium, ATMs (109) and merchant terminals (108) for stored value cards use an application program called Proton.

Thus, before the smart card (101) can be used in Belgium with Proton-based ATMs (109) and merchant terminals (108), the programmable application module (105) must be programmed to function as a Proton module (106). Once programmed, the Proton module (106) enables the smart card (101) to interact with Proton based ATMs (109) and merchant terminals (108) in exactly the same manner as the ZKA module 104 allows interaction with ZKA-based systems described above.

The programming of the programmable application module (105) to a Proton module (106) can be performed at the German ATM (111) or the Belgian ATM (109). If the smart card is not programmed with a Proton module (106) until it arrives in Belgium, the Belgian ATM (109) must be designed to recognize the smart card (101) as a card using a foreign application that can be programmed with the local application. This is accomplished by designing the ATMs to recognize the messages sent by the ATM interpreter (103) which lists the applications the card has been programmed to support and to inform the ATM that the card is programmable. The Belgian ATM (109) will then give the cardholder the option to program the smart card (101) with the Proton application program.

Again, this is best accomplished if the same financial institution owns and operates the ATMs in both countries and the ATMs are connected to the same international ATM network (110). Thus, when the German cardholder arrives in Belgium, the cardholder's smart card (101) will be recognized as an application programmable smart card because of the message from the ATM interpreter (103). The Belgian ATM (109) will then ask the cardholder for permission to program the programmable application module (105) with the Proton application (106).

Once this is accomplished, because the ATMs (109) and (111) are tied to the same financial institution, the German cardholder can remove funds from his account in Germany. The funds are processed through a funds exchanger (FX) that uses the current conversion rate to convert the funds from German deutschmarks to Belgian franks. The amount in franks is then stored as a value on the newly programmed smart card (101) which can be used at a Belgian merchant terminal 108 to pay for a purchase.

Alternatively, this entire process of programming and converting funds could be performed at the German ATM (111) if the cardholder anticipates a trip to Belgium. When the cardholder no longer needs Belgian franks stored on the smart card (101), the cardholder can use either the Belgian ATM (109) or the German ATM (111) to process the stored franks through the funds exchanger and return the remaining value in deutschmarks to the cardholder's German account. Because the cardholder in the example is German, the ZKA module 104 remains on the card. When the smart card (101) is returned to Germany, it can be used with a ZKA-based ATM (111) or merchant terminal (107) without being reprogrammed.

Figure 3:
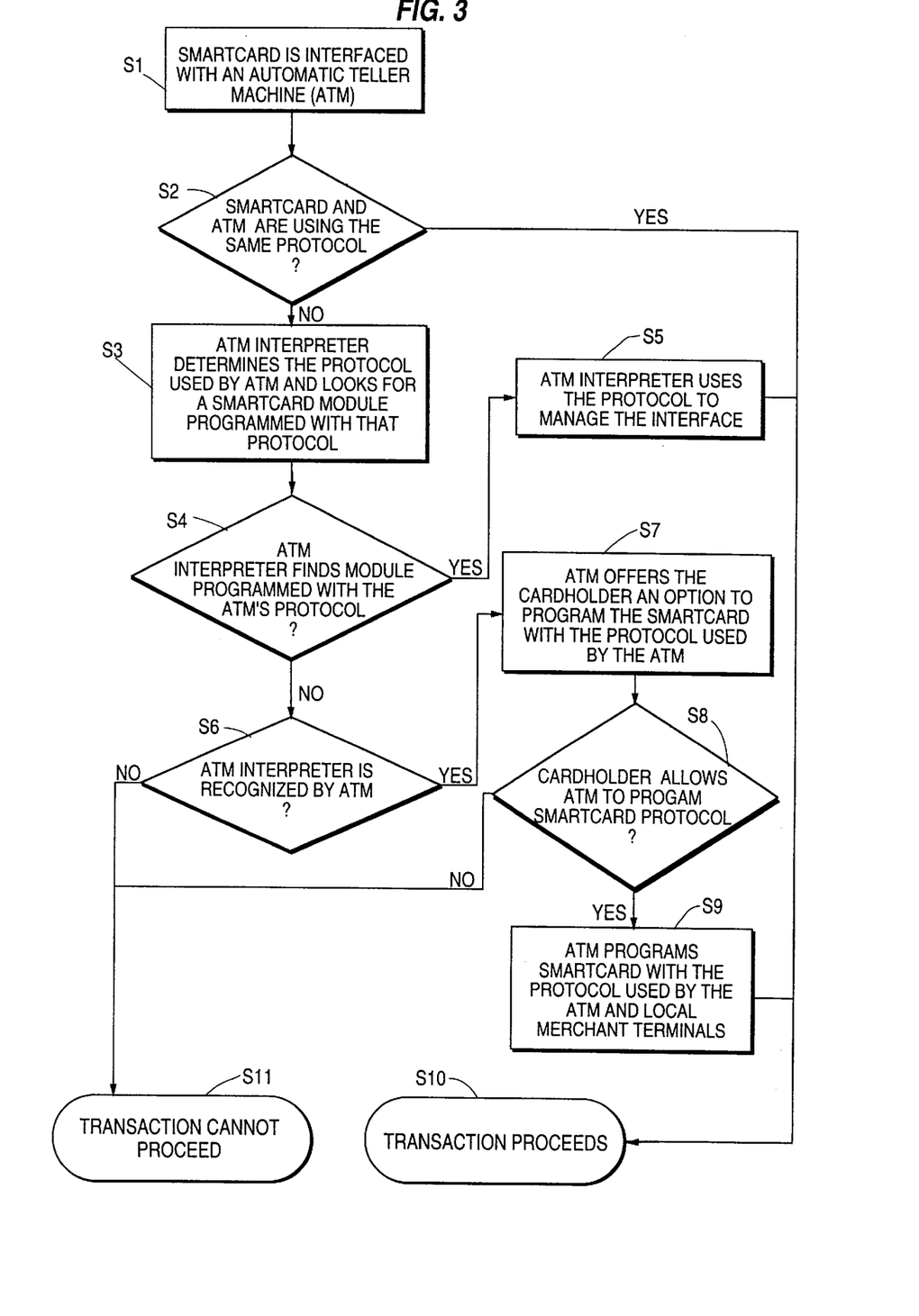
FIG. 3 is a flow chart showing the method steps executed by the smart card according to the present invention.

FIG. 3 is a flow chart illustrating the steps in the method of the present invention as they are executed by the smart card. In step S1, the smart card is physically interfaced with an ATM. In step S2, the smart card receives a reset (RST) signal from the ATM. The card uses this signal to reset itself or to initiate a reset procedure.

In step S3, the smart card responds to the ATM with an answer-to-reset (ATR) signal. The ATM interpreter then sends a message that informs the ATM which application programs the smart card has been programmed to function with and that the card is programmable.

In step S4, the card receives a message from the ATM indicating which, if any, of the application programs available on the smart card the ATM can support. If the ATM indicates that it can support one of the applications programmed on the card, in step S8, the transaction supported by that application can proceed.

If the ATM does not support any applications for which the card is programmed, the ATM may attempt to add application programming to the smart card. If the ATM cannot add programming to the card, the transaction cannot proceed, step S9. If the ATM does add programming to the smart card, a new application module will be created on the card in step S6. In step S7, the ATM interpreter will use the new programming added to the card to successfully transact with the ATM in step S8.

Figure 4:
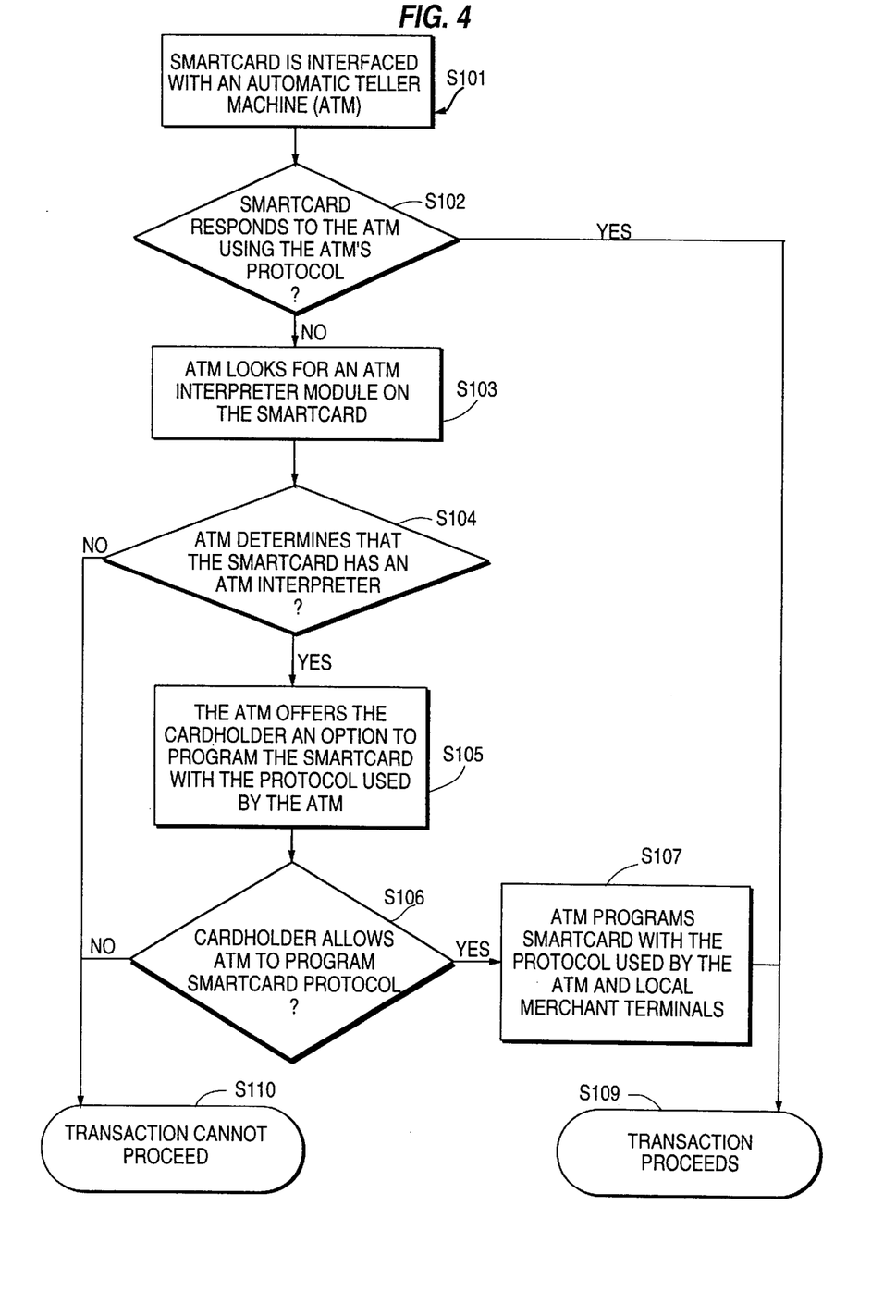
FIG. 4 is a flow chart showing the method steps executed by the automatic teller machine according to the present invention.

FIG. 4 is a flow chart illustrating the steps in the method of the present invention as they are executed by an ATM. In step S101, the smart card is physically interfaced with the ATM. In step S102, the ATM sends the RST signal to the smart card. In step S103, the ATM receives the signal from the smart card indicating which applications the smart card can support and whether or not the smart card is programmable for other application programs.

In step S104, the ATM determines whether the smart card supports an application recognized by the ATM. If so, in step S109, a transaction in that application can proceed. If not, the ATM will determine, based on the signal received from the card, whether the smart card is programmable. If the card is not programmable, in step S110, the transaction cannot proceed. If the card is programmable, in step S106, the ATM offer the cardholder an option to add application programming to the smart card so that it may transact with the ATM.

In step S107, the cardholder responds. If the cardholder refused permission to add programming to the card, in step S110, the transaction cannot proceed. If the cardholder requests that the ATM add programming to the card, the ATM will do so in step S108. After the new application programming has been added to the card, in step S109, the transaction between the card and the ATM can proceed based on that application.

The proceeding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An application programmable smart card comprising:
   an interpreter which manages an interface between the smart card and a first system used in a first country or region and a second system used in a second country or region for interacting with the smart card;
   a first application module resident on the smart card and programmed with a first application for interfacing the smart card with the first system;
   a second programmable application module resident on the smart card and programmed with a second application for interfacing the smart card with the second system; and further wherein the first application is incompatible with the second application;

wherein the interpreter uses application information from the first and second application modules to manage the interfaces between the smart card and the first and second systems, respectively;

the management of the interfaces including the interpreter dynamically loading first parameters from the first application module characteristic of the first application program being used in the first country or region and thereby mimicking the functionality of the first application program;

the interpreter further dynamically loading second parameters from the second application module characteristic of the second application program being used in the second country or region and thereby mimicking the functionality of the second application program;

further, wherein the first parameters and second parameters include security procedures, keying schemes and access conditions used in the first and second systems, respectively;

further, wherein the first and second application modules provide the interpreter with respective maps of data locations that map the data location of the data in their respective master files with the respective data structures specified in the application programs; and further, wherein the second programmable application module is remotely programmable and is downloaded to the smart card via a terminal on the second system and located in the second region or country.

2. A first financial transaction system comprising:

a first automatic teller machine affiliated with a first system in a first region or country;

a second automated teller machine affiliated with a second system in a second region or country;

a smart card for sue with both the automatic teller machines;

a first programmable application module disposed on the smart card compatible with the first system;

an interpreter disposed on the smart card which manages a first interface between the smart card and the first automatic teller machine using first application programming from the first application module to manage the first interface;

a second programmable application module compatible with the second system and incompatible with the first system which may be downloaded from the second system via the second automated teller machine to the smart card;

the interpreter disposed on the smart card also managing a second interface between the smart card and the second automated teller machine using second application programming from the second application module to manage the second interface;

further, wherein the management of the interfaces includes the interpreter dynamically loading first parameters from the first application module characteristic of the first application program being used in the first country or region and thereby mimicking the functionality of the first application program;

the interpreter further dynamically loading second parameters from the second application nodule characteristic of the second application program being used in the second country or region and thereby mimicking the functionality of the second application program;

further, wherein the first parameters and second parameters include security procedures, keying schemes and access conditions used in the first and second systems, respectively;

further, wherein the first and second application modules provide the interpreter with respective maps of data locations that map the data location of the data in their respective master files with the respective data structures specified in the application programs; and further, wherein the second programmable application module is remotely programmable and is downloaded to the smart card via the second automated terminal machine on the second system and located in the second region or country.

3. A method of using a smart card with a variety of applications comprising the steps of:

providing an interpreter on the smart card which manages an interface between the smart card and a first system used in a first country or region transacting with the smart card; and providing a first application module on the smart card that is programmed with a first application for interfacing the smart card with the first system;

wherein the interpreter uses first application information from the first application module to manage the first interface between the smart card and the first system providing a second application module on the smart card that is programmed with a second application for interfacing the smart card with a second system used in a second country or region;

wherein the interpreter uses second application information from the second application module to manage the second interface between the smart card and the second system;

further, wherein the interfacing between the smart card and the first system and the second system includes the steps of:

the interpreter dynamically loading first parameters from the first application module characteristic of the first application program being used in the first country or region and thereby mimicking the functionality of the first application program when the card is in use in the first country or region;

the interpreter further dynamically loading second parameters from the second application module characteristic of the second application program being used in the second country or region and thereby mimicking the functionality of the second application program when the card is in use in the second country or region;

further, wherein the first parameters and second parameters include security procedures, keying schemes and access conditions used in the first and second systems, respectively;

further, wherein the first and second application modules provide the interpreter with respective maps of data locations that map the data location of the data in their respective master files with the respective data structures specified in the respective application programs; and further, wherein the second programmable application module is remotely programmable and is downloaded to the smart card via a terminal on the second system and located in the second region or country.

4. A method of providing a smart card using a variety of applications comprising the steps of:

providing a first automatic teller machine;

providing a smart card for use with the first automatic teller machine;

providing a first programmable application module disposed on said smart card;

providing an interpreter disposed on said smart card;

managing a first interface between the smart card and the first automatic teller machine with the interpreter which uses a first application programming from the first application module to manage the first interface between the smart card and the first automatic teller machine providing a second automatic teller machine;

providing a smart card for use with the second automatic teller machine;

downloading a second programmable application module to the smart card from the second automated teller machine in response to a signal from the smart card to the second automated teller machine that the smart card did not previously contain the second programmable application module;

managing a second interface between the smart card and the second automatic teller machine with the interpreter which uses a second application programming from the second application module to manage the second interface between the smart card and the second automatic teller machine;

the management of the interfaces including the interpreter dynamically loading first parameters from the first application module characteristic of the first application program being used in the first country or region and thereby mimicking the functionality of the first application program when the cards is in use in the first country or region;

the interpreter further dynamically loading second parameters from the second application module characteristic of the second application program being used in the second country or region and thereby mimicking the functionality of the second application program when the smart card is in use in the second country or region;

further, wherein the first parameters and second parameters include security procedures, keying schemes and access conditions used in the first and second systems, respectively;

further, wherein the first and second application modules provide the interpreter with respective maps of data locations that map the data location of the data in their respective master files with the respective data structures specified in the application programs; and further, wherein the second programmable application module is remotely programmable and is downloaded to the smart card via the second automated teller machine on the second system and located in the second region or country.

* * * * *